United States Patent
Jang et al.

(10) Patent No.: US 9,919,379 B1
(45) Date of Patent: Mar. 20, 2018

(54) FRICTION RIVET FOR JOINING DIFFERENT MATERIALS

(71) Applicant: Hyundai Motor Company, Seoul (KR)

(72) Inventors: Jun Ho Jang, Yongin-si (KR); Shin Hu Cho, Suwon-si (KR); Jong Kook Lee, Suwon-si (KR); Hoon Mo Park, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/486,776

(22) Filed: Apr. 13, 2017

(30) Foreign Application Priority Data

Dec. 22, 2016 (KR) ........................ 10-2016-0177091

(51) Int. Cl.
| | |
|---|---|
| *B23K 20/00* | (2006.01) |
| *B23K 20/227* | (2006.01) |
| *F16B 19/08* | (2006.01) |
| *B21J 15/02* | (2006.01) |
| *B29C 65/60* | (2006.01) |
| *B29C 65/06* | (2006.01) |
| *B29C 65/00* | (2006.01) |
| *B23K 103/20* | (2006.01) |
| *B23K 103/18* | (2006.01) |
| *B23K 103/16* | (2006.01) |
| *B29K 705/00* | (2006.01) |

(52) U.S. Cl.
CPC .......... *B23K 20/227* (2013.01); *B21J 15/027* (2013.01); *B23K 20/2275* (2013.01); *B29C 65/0672* (2013.01); *B29C 65/601* (2013.01); *B29C 66/742* (2013.01); *F16B 19/08* (2013.01); *B23K 2203/16* (2013.01); *B23K 2203/18* (2013.01); *B23K 2203/20* (2013.01); *B29K 2705/00* (2013.01)

(58) Field of Classification Search
CPC .... B29C 65/0672; B29C 65/06; B21J 15/025; B21J 15/02; B21J 15/027; B21J 15/08; B21J 15/12; B23K 11/0066; B23K 11/20; B23K 20/12
USPC ............... 228/2.3; 156/73.5; 29/243.53, 432, 29/524.1, 525.06, 798
See application file for complete search history.

(56) References Cited

U.S. PATENT DOCUMENTS

| | | | | |
|---|---|---|---|---|
| 3,468,732 A | * | 9/1969 | Hewitt | ................. B29C 65/0672 156/154 |
| 6,763,568 B1 | * | 7/2004 | Mauermann | ........... B21J 15/025 29/243.53 |
| 2014/0174669 A1 | | 6/2014 | Zebisch et al. | |

* cited by examiner

*Primary Examiner* — Erin B Saad
(74) *Attorney, Agent, or Firm* — Morgan, Lewis & Bockius LLP

(57) ABSTRACT

Disclosed are a friction rivet for joining a non-steel material and a steel material and a joining method using the same, wherein inserts are applied to the friction rivet and, thus, the friction rivet doesn't need to be replaced according to materials of a lower plate and damage to an upper plate caused by penetration into the upper plate by the friction rivet may be repaired.

10 Claims, 4 Drawing Sheets

FRICTION RIVET FOR JOINING DIFFERENT MATERIALS

CROSS-REFERENCE(S) TO RELATED APPLICATIONS

The present application claims priority to Korean Patent Application No. 10-2016-0177091 filed on Dec. 22, 2016, the entire contents of which are incorporated herein for all purposes by this reference.

BACKGROUND OF THE INVENTION

Field of the Invention

The present invention relates to a friction rivet for joining a non-steel material and a steel material and a joining method using the same.

Description of Related Art

In the automobile industry, to improve fuel efficiency in consideration of environmental problems, Reductions in the weight of car bodies have been promoted through the use of light-weight metals, such as aluminum alloy, or plastics. For the present purpose, a joining method, which may substitute for spot welding generally applying to assembling a vehicle body, is being considered now.

Mechanical joining technologies for joining a light-weight material and a steel material have been developed and applied and, particularly one mechanical joining technology, friction rivet joining is referred to as Friction Element Welding (FEW) and is applied hereto FEW is technology in which a rivet is rotated by pressure, passes through an upper plate formed of a light-weight material and is welded to a lower plate formed of a steel material using frictional heat caused by rotational friction. Since friction joining between the rivet and the lower plate is only possible when the material of the rivet has a hardness level similar to the material of the lower plate, utility of FEW is limited. Further, to reinforce stiffness of a vehicle body or to complement joining force of a joining part, an adhesive may be applied between an upper plate and a lower plate and, when friction rivet joining is applied, friction may not effectively occur due to the adhesive and, thus, welding strength may be lowered.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a friction rivet for joining different materials which may firmly join a non-steel material and a steel material, and a joining method using the same.

An aspect of the present invention is directed to providing a friction rivet for joining different materials, including a head part, a body part protruding from the lower region of the head part, and a cavity recessed from the terminal of the body part, wherein a second insert and a first insert are sequentially stacked from the upper region of the cavity and accommodated in the cavity, and a flow path forming a flow route to discharge the second insert is formed through the internal surface of the body part forming the cavity and the external surface of the body part.

In an exemplary embodiment, the first insert may be formed of low carbon steel (mild steel) including an alloying element.

In another exemplary embodiment, the alloying element may include one or more selected from the group consisting of vanadium (V), tungsten (W), molybdenum (Mo), niobium (Nb) and titanium (Ti), and low carbon steel may have 0.13% by weight to 0.2% by weight of carbon (C).

In still another exemplary embodiment, the second insert may be formed of a thermoplastic resin.

In yet another exemplary embodiment, the thermoplastic resin may include one or more selected from the group consisting of polyvinyl alcohol (PVA), vinyl acetate, polypropylene (PP), polyamide (PA) and polyether ether ketone (PEEK).

In still yet another exemplary embodiment, the flow path may be inclined downwards.

In a further exemplary embodiment, the flow paths may be plurally formed radially about a central axis of the friction rivet.

In another further exemplary embodiment, the cavity may be recessed from the terminal of the body part to be narrowed in the upward direction.

In still another further exemplary embodiment, the cavity narrowed upwardly in a stepped way may be recessed.

Another aspect of the present invention is directed to providing a joining method between an upper plate formed of a non-steel material and a lower plate formed of a steel plate, including locating the friction rivet on the upper plate, causing the friction rivet to pass through the upper plate and thus to contact the lower plate by rotating the friction rivet while applying pressure thereto, welding a first insert and the lower plate using frictional heat generated from a friction area by continuously rotating and pressurizing the friction rivet in the contact state between the friction rivet and the lower plate, and melting a second insert using frictional heat transmitted through the first insert and thus discharging the second insert in a molten state to the outside of the friction rivet through a flow path.

The methods and apparatuses of the present invention have other features and advantages which will be apparent from or are set forth in more detail in the accompanying drawings, which are incorporated herein, and the following Detailed Description, which together server to explain certain principles of the present invention.

Figure 1:
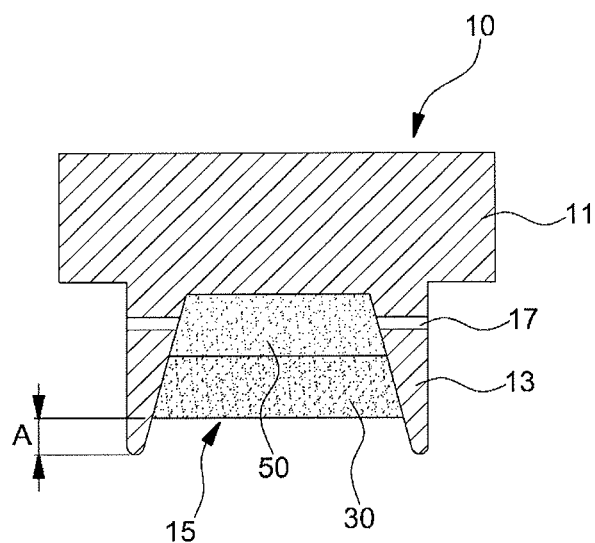
FIG. 1 is a cross-sectional view of a friction rivet for joining different materials in accordance with an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following description of the present invention, a detailed description of known functions and configurations incorporated herein will be omitted when it may make the subject matter of the present invention rather unclear. In the following description of the embodiments, the term "including" will be interpreted as indicating the presence of other elements, unless stated otherwise, and does not exclude presence of the corresponding elements.

In the following description of the embodiments, the term "upper side" or "upper surface" means an upper direction or a surface facing in the upper direction in FIG. 1, and the term "lower side" or "lower surface" means a lower direction or a surface facing in the lower direction in FIG. 1.

FIG. 1 is a cross-sectional view of a friction rivet for joining different materials (hereinafter referred to as a "friction rivet") in accordance with an exemplary embodiment of the present invention.

With reference to FIG. 1, a friction rivet 10 includes a head part 11, a body part 13 protruding from the lower region of the head part 11, and a cavity 15 recessed from the terminal of the body part 13.

The head part 11 and the body part 13 form an external frame of the friction rivet 10, and the cavity 15 having a hole shape is formed at the center of the terminal of the body part 13 so that a second insert 50 and a first insert 30 are accommodated within the cavity 15.

The head part 11 and the body part 13 may be formed of structural carbon steel, carbon steel for cold heading, boron steel, etc., and may be formed of structural carbon steel. A structural carbon steel has approximately 0.25% by weight to 0.45% by weight of carbon (C) with respect to the gross weight of structural carbon steel.

A friction rivet 10 in accordance with the present invention joints different materials using frictional heat between the first insert 30 and not the body part 13, and a lower plate formed of a steel material.

Conventionally, just when a material of a friction rivet is controlled according to physical properties of a steel material forming a lower plate, mutual friction therebetween is possible and thus joining therebetween is carried out. For example, when a steel plate having hardness of 300 Hv is used as a lower plate, a friction rivet may be manufactured by using a material having hardness similar to the hardness of the steel plate to achieve joining therebetween.

On the other hand, a friction rivet in accordance with the present invention does not need to be replaced according to a material of the lower plate and may thus remarkably improve mass producibility, flexibility to material change, etc.

The first insert 30 may be formed of low carbon steel (mild steel) including an alloying element.

The alloying element provides to generate a carbide due to frictional heat and thus to increase welding strength, and may include one or more selected from the group consisting of vanadium (V), tungsten (W), molybdenum (Mo), niobium (Nb) and titanium (Ti). However, carbon (C), sulfur (S), phosphorus (P), etc., which may hinder weldability, may not be used as the alloying element.

The first insert 30 may be formed of low carbon steel having a lower carbon content than structural carbon steel forming the head part 11 and the body part 13. Here, low carbon steel having approximately 0.13% by weight to 0.2% by weight of carbon (C) may be used.

In the friction rivet 10 in accordance with the present invention, the second insert 50 is liquefied by frictional heat and thus discharged to the outside of the friction rivet 10 through a flow path 17, improving joining performance of the friction rivet 10 and repairing damage to an upper plate caused by penetration into an upper plate by the friction rivet 10.

Since the second insert 50 may be discharged to the outside of the friction rivet 10, the flow path 17 may be formed through the internal surface of the body part 13 forming the cavity 15, The internal surface of the body part 13 contacting the second insert 50, and the external surface of the body part 13.

Figure 2:
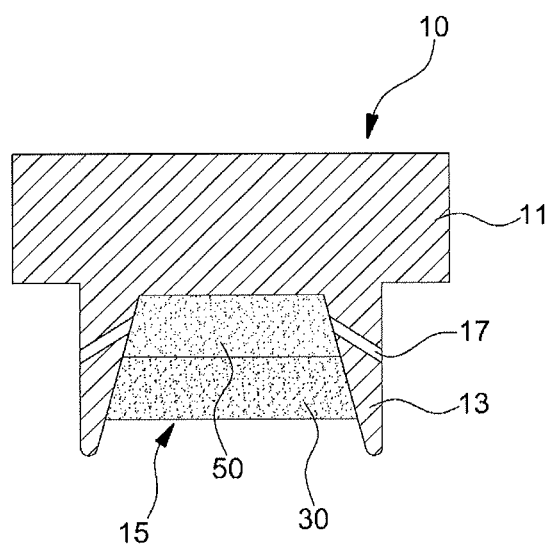
FIG. 2 is a cross-sectional view illustrating a flow path of a friction rivet for joining different materials in accordance with another exemplary embodiment of the present invention.

The flow path 17 may be formed to pass through the body part 13 in a rectilinear shape in a direction perpendicular to a rotation axis of the friction rivet 10, as exemplarily shown in FIG. 1. However, the formation of the flow path is not limited thereto and the flow path 17 may be inclined downwards, as exemplarily shown in FIG. 2.

Alternatively, flow paths 17 may be formed radially about a central axis (i.e., the rotation axis) of the friction rivet 10. Therefore, as circumstances require, a plurality of flow paths 17 may be formed and, four to six flow paths may be formed to be symmetrical about the central axis of the friction rivet 10.

The second insert 50 may be formed of a thermoplastic resin which is configured to change into a liquid phase by frictional heat.

The thermoplastic resin may include one or more selected from the group consisting of polyvinyl alcohol (PVA), vinyl acetate, polypropylene (PP), polyamide (PA) and polyether ether ketone (PEEK).

A process of discharging the second insert 50 through the flow path 17 will be more concretely and clearly understood through a joining method using the friction rivet 10, which will be described later.

The cavity 15 may be formed in a recessed shape from the terminal of the body part 13 to be narrowed in the upward direction. Due to such a shape of the cavity 15, the second insert 50 may have a smaller size than that of the first insert 30, as exemplarily shown in FIG. 1.

Figure 3:
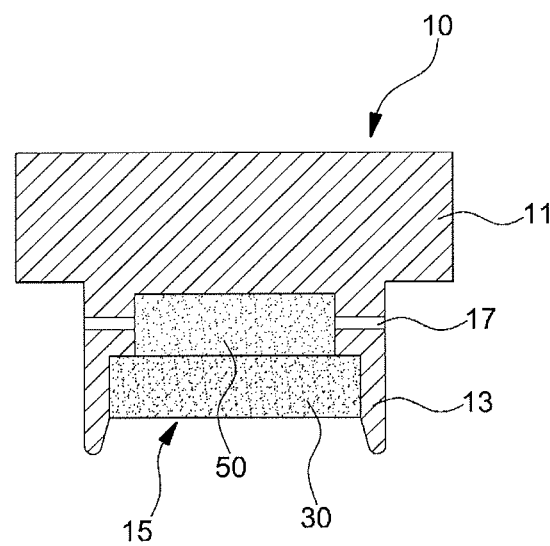
FIG. 3 is a cross-sectional view illustrating a cavity of a friction rivet for joining different materials in accordance with yet another exemplary embodiment of the present invention.
Figure 4A:
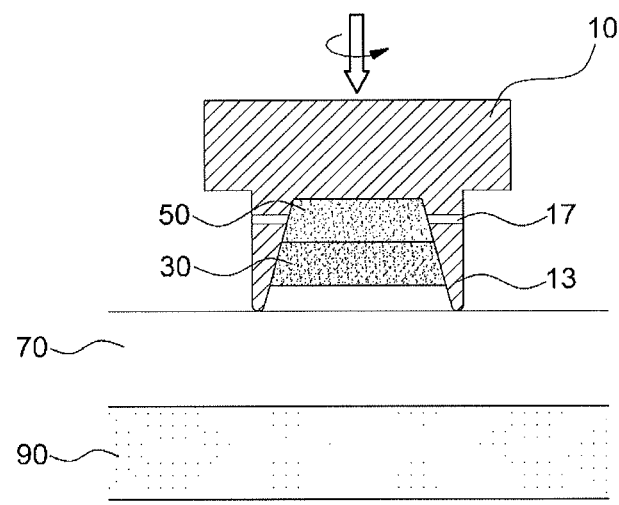
FIG. 4A, FIG. 4B, FIG. 4C, FIG. 4D, and FIG. 4E are cross-sectional views illustrating respective operations of a method of joining different materials in accordance with the present invention.
Figure 4B:
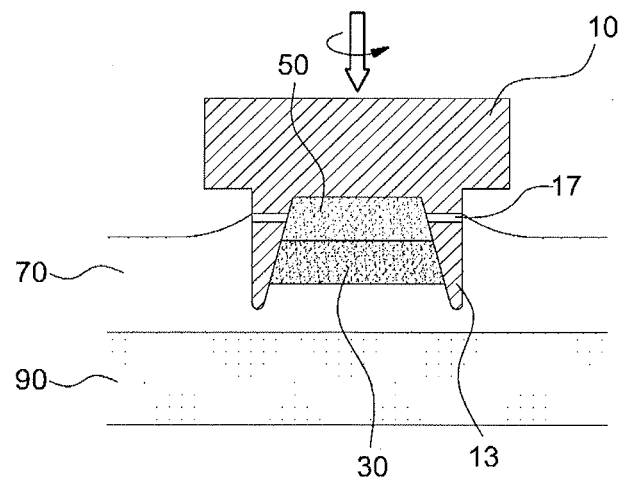
Figure 4C:
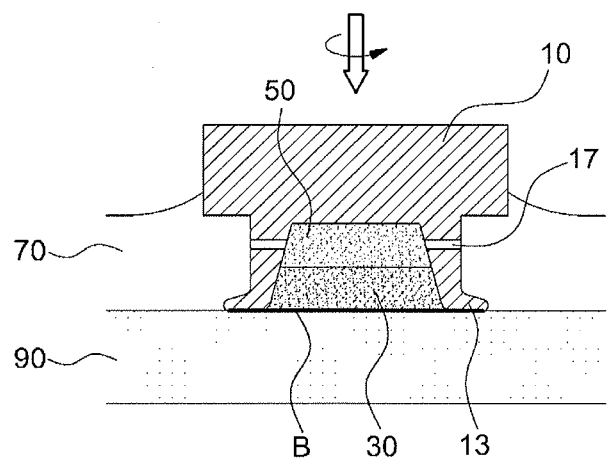
Figure 4D:
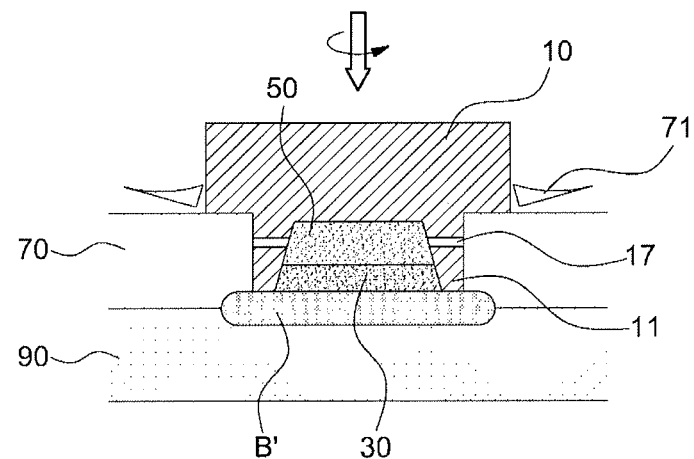
Figure 4E:
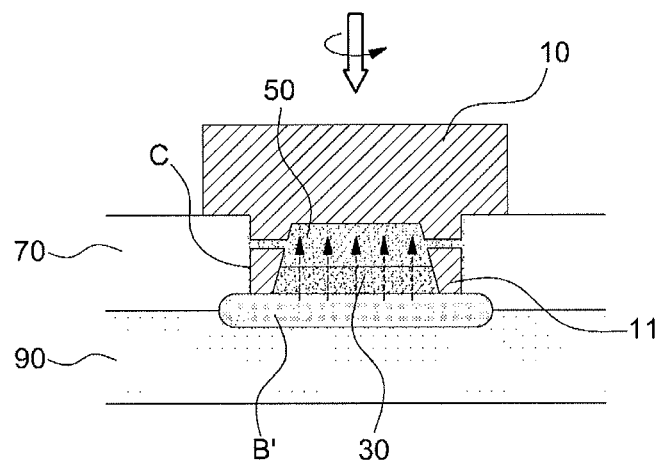

However, the cavity 15 may be formed in a recessed shape and in a stepped way to accommodate a first insert 30 and a second insert 50, stacked in a stepped way, as exemplarily shown in FIG. 3. Here, the stepped way means a difference between the thickness of a portion of the body part 13 surrounding the first insert 30 and the thickness of a portion of the body part 13 surrounding the second insert 50. The cavity 15 may first be recessed to a predetermined distance in the vertical direction from the terminal of the body part 13, be bent in the horizontal direction to have a predetermined reduced width, and then be recessed again to a predetermined distance in the vertical direction, having a stepped structure.

When the second insert 50 and the first insert 30 are accommodated in the cavity 15, a distance A from the terminal of the body part 13 to the first insert 30 may have a minimal value which is greater than 0. When the distance A is 0, it may be difficult for the cavity 15 to firmly accommodate the first insert 30. On the other hand, when the distance A is excessively large, the first insert 30 may not contact a lower plate during a joining process.

Hereinafter, a method of joining different materials in accordance with the present invention will be described in detail with reference to FIG. 4(*a*) to FIG. 4(*e*).

The joining method of the present invention is a joining method between an upper plate 70 formed of a non-steel material and a lower plate 90 formed of a steel material, and such a method includes the following operations.

First, the upper plate 70 may be formed of a light-weight material including carbon fiber reinforced plastic (CFRP) or aluminum, and the lower plate 90 may be formed of a steel material including a steel plate.

As exemplarily shown in FIG. 4(*a*), the friction rivet 10 is located on the upper plate 70.

Thereafter, as exemplarily shown in FIG. 4(*b*), by rotating the friction rivet 10 while applying pressure thereto, the friction rivet 10 passes through the upper plate 70 and reaches the lower plate 90.

Thereafter, as exemplarily shown in FIG. 4(*c*), the friction rivet 10 having passed through the upper plate 70 contacts the lower plate 90. In more detail, the body plate 13 is deformed by pressure applied to the friction rivet 10 and the first insert 30 contacts the lower plate 90. Therefore, a friction area B between the first insert 30 and the lower plate 90 is generated.

Thereafter, as exemplarily shown in FIG. 4(*d*), by continuously rotating the friction rivet 10 while applying pressure thereto, the friction area B reaches a temperature of approximately 600° C. to 700° C. and, thus, the first insert 30 and the lower plate 90 are welded by frictional heat (shown in an area B'). Burrs 71 of the upper plate 70 are generated around the head part 11 due to rotation of the friction rivet 10. Such burrs 71 are discharged to the outside of the friction rivet 10 and may thus be easily removed.

Thereafter, as exemplarily shown in FIG. 4(*e*), since the friction rivet 10 is continuously rotated under the condition that the friction rivet 10 passes through the upper plate 70, there is a high possibility that the upper plate 70 surrounding the friction rivet 10 may be damaged. Therefore, in an exemplary embodiment of the present invention, to repair damage to the upper plate 70, the second insert 50 may be discharged to the outside of the friction rivet 10 through the flow path 17. In more detail, when the temperature of the friction area B is raised and thus reaches a temperature at which welding may be carried out, frictional heat is transferred by conduction to the second insert 50 through the first insert 30 and, thus, the second insert 50 is melted. That is, the second insert 50 is changed into a flowable liquid phase. Then, the second insert 50 in the liquid phase is discharged to the outside of the friction rivet 10 along the flow path 17 by centrifugal force due to rotation of the friction rivet 10 and pressure applied by the first insert 30. Accordingly, a coating film C is formed at a contact surface between the friction rivet 10 and the upper plate 70. The coating film C repairs and reduces damage to the upper plate 70, and reduces a contact area between the upper plate 70 and the friction rivet 10 to prevent galvanic corrosion.

As is apparent from the above description, a friction rivet for joining different materials and a joining method using the same in accordance with the present invention may have effects as described infra.

Frictional force between a first insert and a lower plate is used to join an upper plate and the lower plate and, thus, the same friction rivet may be applied regardless of the kinds of steel material of the lower plate and the utility of the friction rivet may be greatly improved.

Further, a second insert in a liquid phase is discharged to the outside of the friction rivet through a flow path and repairs defects including cracks of the upper plate, generated when the friction rivet passes through the upper plate formed of a light-weight material and, thus, product quality and marketability of the friction rivet may be greatly raised.

Moreover, the second insert in the liquid phase is discharged to the outside of the friction rivet and remarkably reduces a contact area between the friction rivet and the upper plate and, thus, a risk of galvanic corrosion may be prevented.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A friction rivet for joining different materials, comprising:
   a head part;
   a body part protruding from a lower region of the head part; and
   a cavity recessed from a terminal of the body part,
   wherein a first insert and a second insert are sequentially stacked from an upper region of the cavity and accommodated in the cavity; and
   wherein a flow path forming a flow route to discharge the second insert is formed through an internal surface of the body part forming the cavity and an external surface of the body part.

2. The friction rivet for joining the different materials of claim 1, wherein the first insert is formed of low carbon steel (mild steel) including an alloying element.

3. The friction rivet for joining the different materials of claim 2, wherein the alloying element includes one or more selected from the group consisting of vanadium (V), tungsten (W), molybdenum (Mo), niobium (Nb) and titanium (Ti); and the low carbon steel has 0.13% by weight to 0.2% by weight of carbon (C).

4. The friction rivet for joining the different materials of claim 1, wherein the second insert is formed of a thermoplastic resin.

5. The friction rivet for joining the different materials of claim 4, wherein the thermoplastic resin includes one or more selected from the group consisting of polyvinyl alcohol (PVA), vinyl acetate, polypropylene (PP), polyamide (PA) and polyether ether ketone (PEEK).

6. The friction rivet for joining the different materials of claim 1, wherein the flow path is configured to be inclined downwards.

7. The friction rivet for joining the different materials of claim 1, wherein the flow path is plurally formed radially about a central axis of the friction rivet.

8. The friction rivet for joining the different materials of claim 1, wherein the cavity is recessed from the terminal of the body part to be narrowed in an upward direction.

9. The friction rivet for joining the different materials of claim 8, wherein the cavity narrowed in the upward direction is recessed to have a width difference in a stepped way.

10. A joining method between an upper plate formed of a non-steel material and a lower plate formed of a steel plate, comprising:

locating the friction rivet according to claim 1 on the upper plate;

causing the friction rivet to pass through the upper plate and thus to contact the lower plate by rotating the friction rivet while applying pressure thereto;

welding the first insert and the lower plate using frictional heat generated from a friction area by continuously rotating and pressurizing the friction rivet in a contact state between the friction rivet and the lower plate; and melting the second insert using the frictional heat transmitted through the first insert and thus discharging the second insert in a molten state to an outside thereof of the friction rivet through the flow path.

* * * * *